(12) United States Patent
Zou et al.

(10) Patent No.: US 11,411,463 B2
(45) Date of Patent: Aug. 9, 2022

(54) MOTOR BASE AND MOTOR STRUCTURE

(71) Applicant: DELTA ELECTRONICS, INC., Taoyuan (TW)

(72) Inventors: Ching-Cheng Zou, Taoyuan (TW); Han-En Chien, Taoyuan (TW); Hung-Chi Chen, Taoyuan (TW); Meng-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 653 days.

(21) Appl. No.: 16/368,557

(22) Filed: Mar. 28, 2019

(65) Prior Publication Data

US 2020/0227972 A1    Jul. 16, 2020

(30) Foreign Application Priority Data

Jan. 11, 2019  (CN) .......................... 201910026567.9

(51) Int. Cl.
*H02K 5/24* (2006.01)
*H02K 5/02* (2006.01)
(Continued)

(52) U.S. Cl.
CPC .............. *H02K 5/24* (2013.01); *H02K 5/02* (2013.01); *H02K 5/14* (2013.01); *H02K 5/15* (2013.01); *H02K 5/04* (2013.01)

(58) Field of Classification Search
CPC .. H02K 5/24; H02K 5/02; H02K 5/04; H02K 5/15; H02K 21/22; H02K 7/14; H02K 11/33; H02K 1/187; H02K 15/14
(Continued)

(56) References Cited

U.S. PATENT DOCUMENTS 6,208,052 B1 *  3/2001  Kershaw .............. F04D 29/582
                                                      165/121
6,507,135 B1 *  1/2003  Winkler .............. F04D 29/0513
                                                      310/90
(Continued)

FOREIGN PATENT DOCUMENTS

CN      102324799 A    1/2012
CN      103527525 A    1/2014
(Continued)

OTHER PUBLICATIONS

JP-H0591923-U (English Translation) (Year: 1993).*
JP-2001197702-A (English Translation) (Year: 2001).*

*Primary Examiner* — Quyen P Leung
*Assistant Examiner* — Alexander Moraza
(74) *Attorney, Agent, or Firm* — Kirton McConkie; Evan R. Witt

(57) ABSTRACT

The present disclosure provides a motor structure including a winding set, a rotor and a motor base. The rotor is driven by the winding set. The motor base includes a central portion, a surrounding portion and at least one connecting element. The central portion is configured to dispose the winding set thereon. The surrounding portion is disposed around the central portion. The connecting element is deformable and connected between the central portion and the surrounding portion. The connecting element includes a first supporting part, a second supporting part and a deformation part. The first supporting part and the second supporting part are connected with the central portion and the surrounding portion, respectively, and the deformation part is connected therebetween. The hardnesses of the first supporting part and the second supporting part are greater than or equal to those of the central portion and the surrounding portion, respectively.

20 Claims, 6 Drawing Sheets

(51) Int. Cl.
*H02K 5/04* (2006.01)
*H02K 5/15* (2006.01)
*H02K 5/14* (2006.01)

(58) Field of Classification Search
USPC ........ 310/51, 89, 91; 415/119; 416/190, 500
See application file for complete search history.

(56) References Cited

U.S. PATENT DOCUMENTS

| | | | |
|---|---|---|---|
| 7,361,844 B2 | 4/2008 | Vinciarelli et al. | |
| 7,762,700 B2 | 7/2010 | Luo et al. | |
| 7,799,615 B2 | 9/2010 | Vinciarelli et al. | |
| 7,845,824 B2 | 12/2010 | Robotham | |
| 9,013,074 B2 | 4/2015 | Figgins et al. | |
| 10,298,848 B2 | 5/2019 | Zhang et al. | |
| 2001/0026107 A1* | 10/2001 | Uruma | F04D 25/06 310/91 |
| 2003/0098660 A1 | 5/2003 | Erdman et al. | |
| 2006/0250039 A1 | 11/2006 | Yamamoto | |
| 2007/0176502 A1 | 8/2007 | Kasai et al. | |
| 2012/0068581 A1* | 3/2012 | Chien | H02K 1/2786 310/68 B |
| 2014/0010636 A1* | 1/2014 | Hsieh | F04D 29/66 415/119 |
| 2014/0021810 A1 | 1/2014 | Figgins et al. | |
| 2016/0099623 A1 | 4/2016 | Bohm et al. | |
| 2016/0316570 A1 | 10/2016 | De Vaan et al. | |
| 2016/0320812 A1* | 11/2016 | Su | G06F 1/206 |
| 2019/0300047 A1* | 10/2019 | Hamada | H02K 5/04 |

FOREIGN PATENT DOCUMENTS

| | | | |
|---|---|---|---|
| CN | 103527525 B | 2/2016 | |
| CN | 105490494 A | 4/2016 | |
| CN | 207819735 U | 9/2018 | |
| CN | 108633216 A | 10/2018 | |
| CN | 208508648 U | 2/2019 | |
| JP | H0591923 U | * 12/1993 | |
| JP | 2001197702 A | * 7/2001 | ........... F04D 29/668 |
| JP | 2012100516 A | 5/2012 | |
| JP | 2012146382 A | 8/2012 | |
| JP | 2015146731 A | 8/2015 | |
| TW | 483658 U | 4/2002 | |
| TW | I525966 B | 3/2016 | |
| TW | I556553 B | 11/2016 | |

* cited by examiner

MOTOR BASE AND MOTOR STRUCTURE

FIELD OF THE INVENTION

The present disclosure relates to a motor base and a motor structure, and more particularly to a motor base and a motor structure having an integrally formed vibration eliminating structure.

BACKGROUND OF THE INVENTION

During the operation of the motor, vibration is unavoidably generated from the main components such as stator and rotor, which result in collision and noise. Generally, the main components of the motor are disposed on the motor base. The conventional motor base has a structure including vibration eliminating material such as rubber and silicon. However, the vibration eliminating material is generally disposed around periphery of the motor base, so that the vibration generated during the operation of the motor is still transferred within the structure of the motor base. Consequently, the vibration adversely affects the other components disposed on the motor base, which means the vibration eliminating effect is unsatisfied. Furthermore, the vibration eliminating material is assembled with the motor base after the manufacture process of the motor base has been finished, which is requiring additional time and effort.

Therefore, there is a need of providing a motor base and a motor structure having an integrally formed vibration eliminating structure to obviate the drawbacks of insufficient vibration eliminating effect encountered from the prior arts and simplify the manufacture process of the motor base and the motor structure.

SUMMARY OF THE INVENTION

It is an object of the present disclosure to provide a motor base and a motor structure having an integrally formed vibration eliminating structure. By utilizing a deformable connecting element connected between the central portion and the surrounding portion of the motor base to provide multidimensional buffer function, the effects of eliminating vibration and noise of the motor base and the motor structure are enhanced.

It is another object of the present disclosure to provide a motor base and a motor structure having an integrally formed vibration eliminating structure. By utilizing the technique such as over molding or insert molding, the buffer component is integrally disposed in and covering the motor base, so as to simplify the assembly process. It also benefits to enhance the effects of eliminating vibration and noise and achieve the effects of waterproofing, dustproof and protection.

In accordance with an aspect of the present disclosure, there is provided a motor structure. The motor structure includes a winding set, a rotor and a motor base. The rotor is corresponding to and driven by the winding set. The motor base includes a central portion, a surrounding portion and at least one connecting element. The central portion is configured to dispose the winding set thereon. The surrounding portion is disposed around the central portion. The connecting element is deformable and connected between the central portion and the surrounding portion. The connecting element includes a first supporting part, a second supporting part and a deformation part. The first supporting part is connected with the central portion, and the hardness of the first supporting part is greater than or equal to that of the central portion. The second supporting part is connected with the surrounding portion, and the hardness of the second supporting part is greater than or equal to that of the surrounding portion. The deformation part is connected between the first supporting part and the second supporting part.

In accordance with another aspect of the present disclosure, there is provided a motor base. The motor base is disposed in a motor structure including a winding set and includes a central portion, a surrounding portion and at least one connecting element. The central portion is configured to dispose the winding set thereon. The surrounding portion is disposed around the central portion. The connecting element is deformable and connected between the central portion and the surrounding portion. The connecting element includes a first supporting part, a second supporting part and a deformation part. The first supporting part is connected with the central portion, and the hardness of the first supporting part is greater than or equal to that of the central portion. The second supporting part is connected with the surrounding portion, and the hardness of the second supporting part is greater than or equal to that of the surrounding portion. The deformation part is connected between the first supporting part and the second supporting part.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
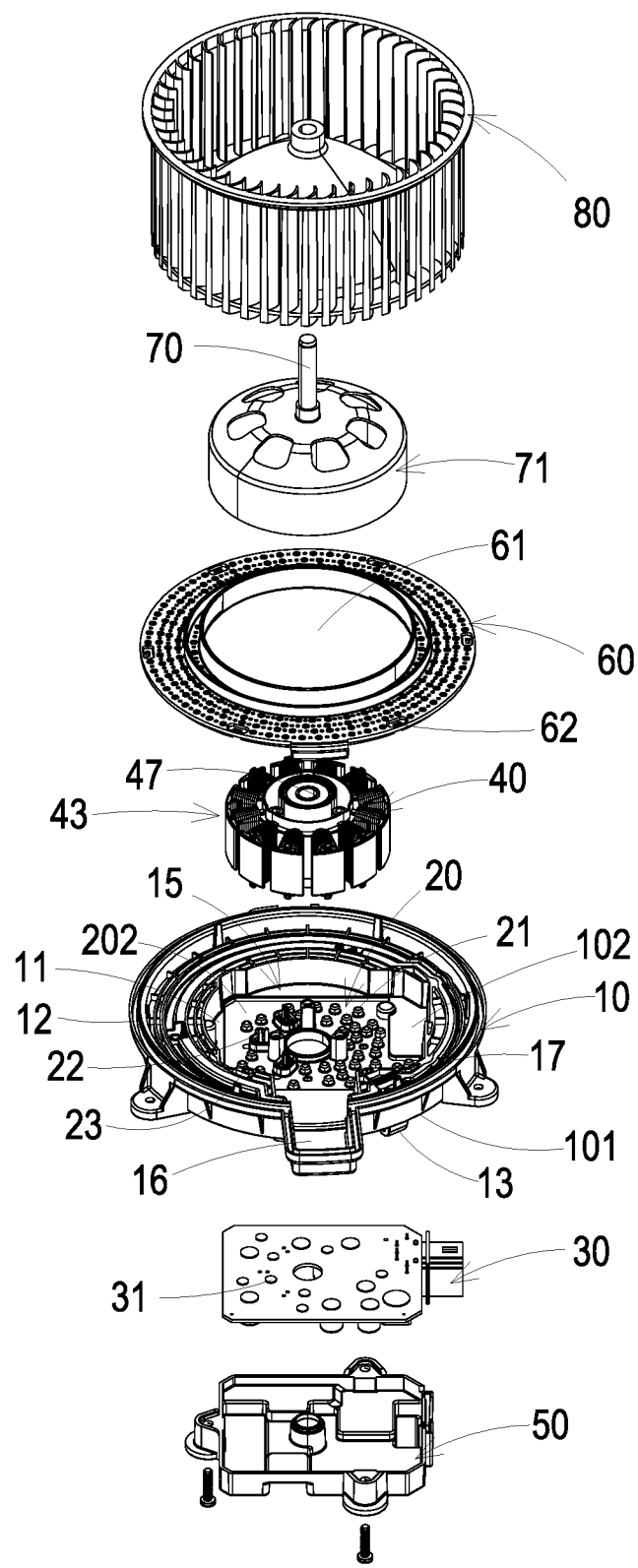
FIG. 1 is an explored view illustrating a motor structure according to an embodiment of the present disclosure.
Figure 2:
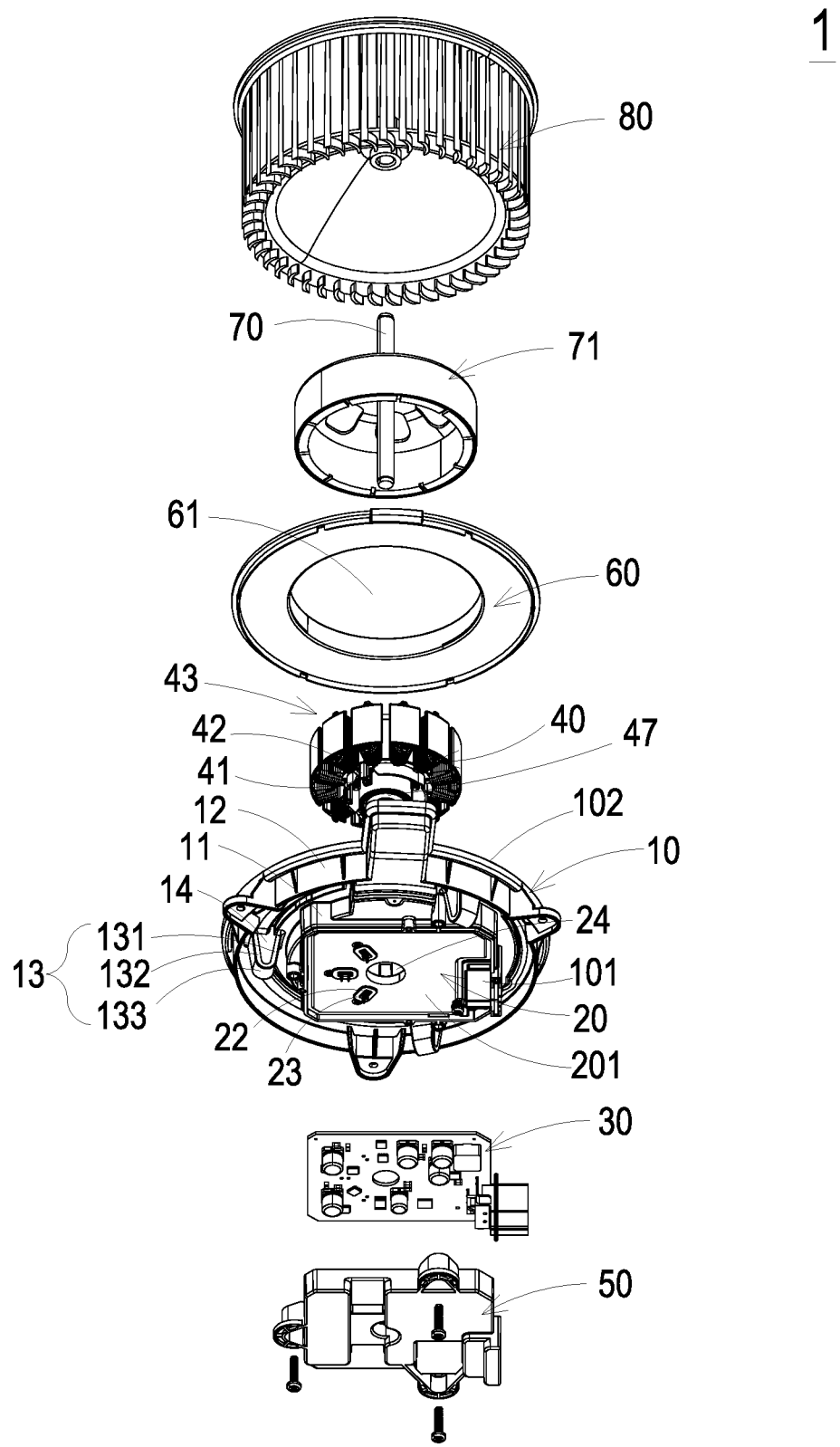
FIG. 2 is another explored view illustrating the motor structure according to the embodiment of the present disclosure and taken at a different observation angle.
Figure 3:
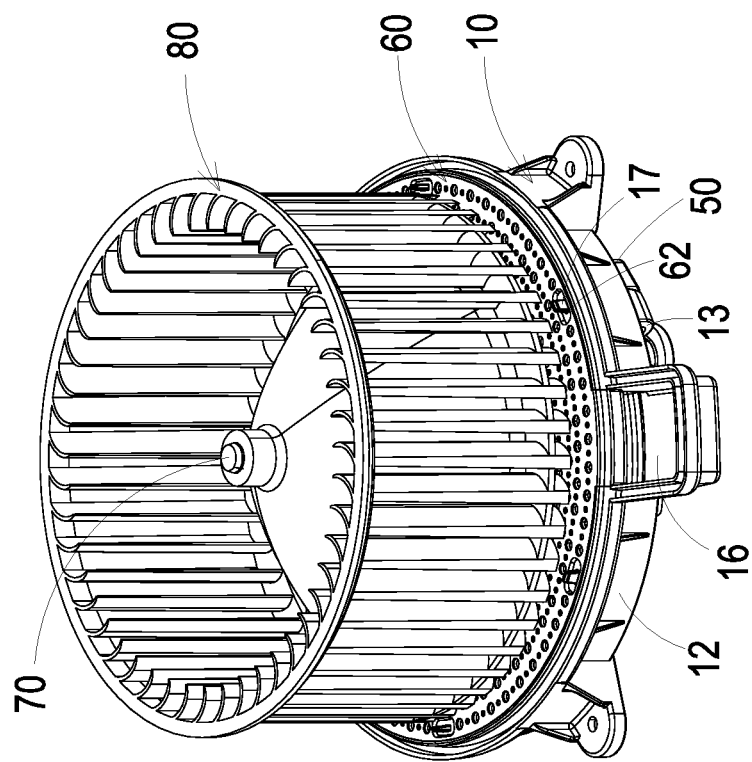
FIG. 3 is a schematic perspective view illustrating the motor structure according to the embodiment of the present disclosure.
Figure 4:
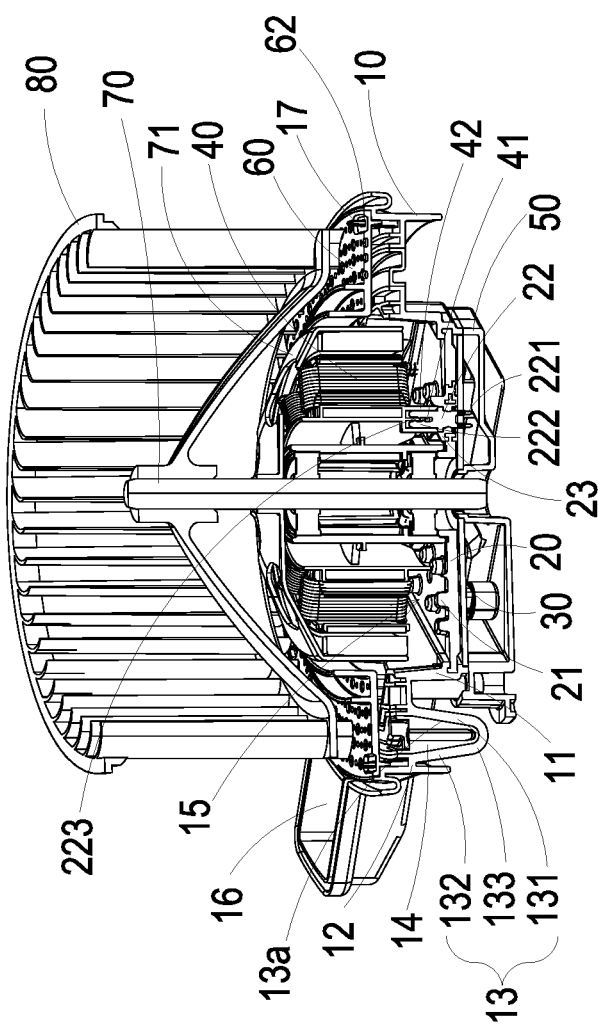
FIG. 4 is a cross sectional view illustrating the motor structure according to the embodiment of the present disclosure.
Figure 5:
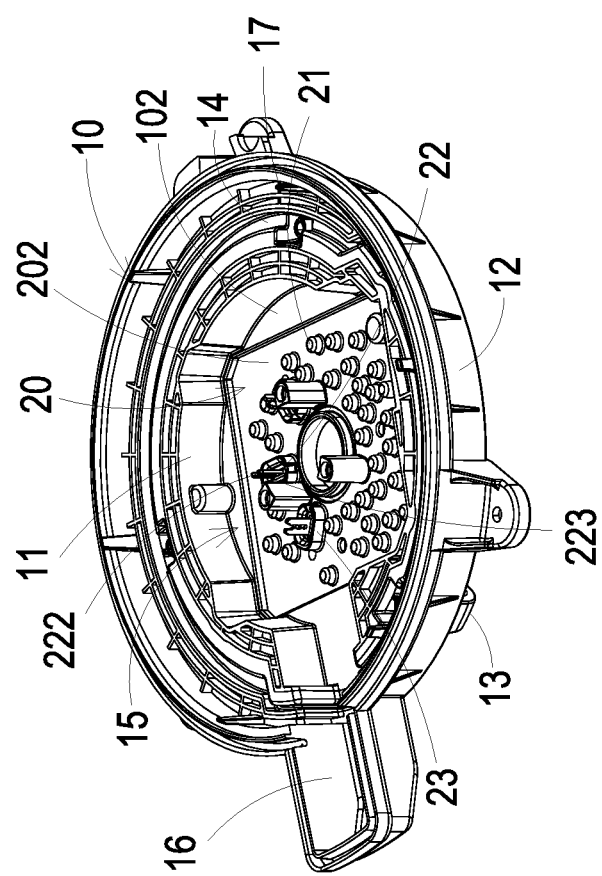
FIG. 5 is a schematic perspective view illustrating the motor base according to the embodiment of the present disclosure.
Figure 6:
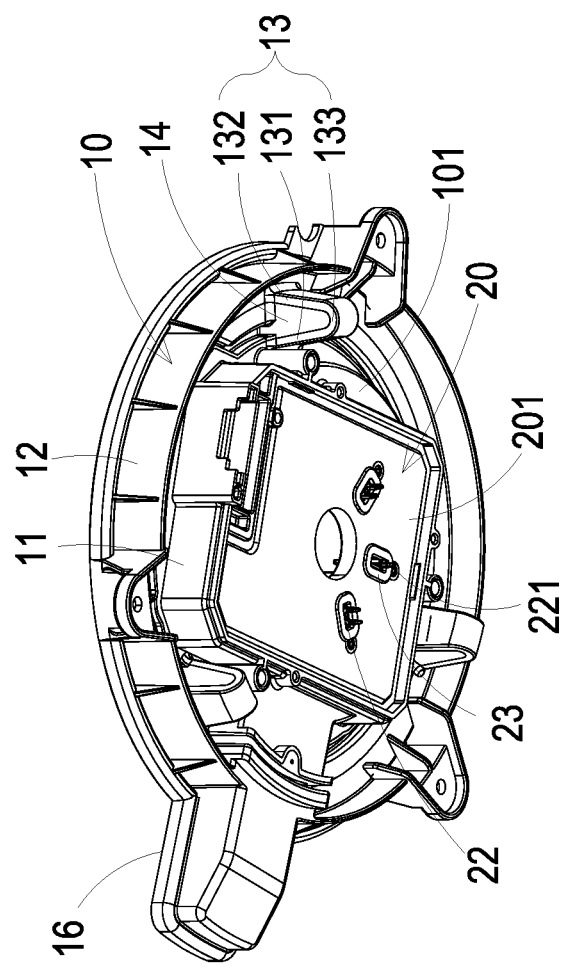
FIG. 6 is another schematic perspective view illustrating the motor base according to the embodiment of the present disclosure and taken at a different observation angle.

FIGS. 1 and 2 are explored views illustrating a motor structure according to an embodiment of the present disclosure. FIG. 3 is a schematic perspective view illustrating the motor structure according to the embodiment of the present disclosure. FIG. 4 is a cross sectional view illustrating the motor structure according to the embodiment of the present disclosure. FIGS. 5 and 6 are schematic perspective views illustrating the motor base according to the embodiment of the present disclosure. In the embodiment, the motor structure 1 includes a motor base 10, a heat dissipation module 20, a circuit board 30, a winding set 40, a first cover 50, a second cover 60, a rotor 71 and a fan blade assembly 80. The motor base 10 includes a central portion 11, a surrounding portion 12, at least one connecting element 13 and a buffer component 14. The heat dissipation module 20 includes a first side 201, a second side 202 and at least one heat dissipation element 21. The first side 201 and the second side 202 are opposite to each other. Preferably but not exclusively, the heat dissipation element 21 is a fin or a bump, which is convexly disposed on the second side 202. The motor base 10 is connected to the heat dissipation module 20 for example through the central portion 11, and uncovers the first side 201 and the second side 202 of the heat dissipation module 20. In the embodiment, the thermal conductivity of the heat dissipation module 20 is greater than the thermal conductivity of the motor base 10. Moreover, in the embodiment, the heat dissipation module 20 and the motor base 10 are further combined with each other by over molding or insert molding so as to integrally form a one-piece structure. The circuit board 30 is disposed on the first side 201 of the heat dissipation module 20. The rotor 71 has a rotating shaft 70 and disposed on the second side 202 of the heat dissipation module 20. The winding set 40 is disposed on the second side 202 of the heat dissipation module 20. The winding set 40 is electrically connected to the circuit board 30. The winding set 40 is configured to drive the rotor 71 to rotate. The rotor 71 rotates through the rotating shaft 70 as an axis. Thus, the motor base 10 and the heat dissipation module 20, which are integrally formed into one piece, are attached to the circuit board 30 through the first side 201 of the heat dissipation module 20. Consequently, the heat generated from the heat-generating components (not shown), which are electronic components disposed on the circuit board 30, can be dissipated effectively. In addition, the motor base 10 and the heat dissipation module 20 are integrally formed into one piece to improve the supporting strength through the second side 202 of the heat dissipation module 20, thereby carrying the winding set 40 firmly.

On the other hand, in the embodiment, the surrounding portion 12 of the motor base 10 is disposed around the central portion 11, and the at least one connecting element 13 is deformable and connected between the central portion 11 and the surrounding portion 12. In the embodiment, the surrounding portion 12 is connected to the central portion 11 through three connecting elements 13 equally spaced apart with each other, but the present disclosure is not limited thereto. In the embodiment, the connecting element 13 further includes a first supporting part 131, a second supporting part 132 and a deformation part 133. In the embodiment, the first supporting part 131 is connected with the central portion 11, and the hardness of the first supporting part 131 is great than or equal to the hardness of the central portion 11. The second supporting part 132 is connected with the surrounding portion 12, and the hardness of the second supporting part 132 is greater than or equal to the hardness of the surrounding portion 12. In addition, the deformation part 133 is connected between the first supporting part 131 and the second supporting part 132, so that the connecting element 13 is deformable and connected between the central portion 11 and the surrounding portion 12. In the embodiment, the central portion 11, the surrounding portion 12 and the at least one connecting element 13 of the motor base 10 are integrally formed into one piece for example by over molding or insert molding, but the present disclosure is not limited thereto. It is noted that the circuit board 30 and the winding set 40 of the motor structure 1 are disposed on the first side 201 and the second side 202 of the heat dissipation module 20, respectively, and the heat dissipation module 20 is further connected to the central portion 11 of the motor base 10. Namely, the circuit board 30 having for example the heat generating components (not shown) to generate the heat and the winding set 40 having for example the main components to generate the vibration are all disposed on the central portion 11 of the motor base 10, and the central portion 11 is connected to the surrounding portion 12 through the at least one connecting element 13. By utilizing the connecting element 13 deformable and connected between the central portion 11 and the surrounding portion 12 to provide a buffer function, the supporting strength of the motor base 10 is improved. It further achieves the functions of eliminating the vibration and the noise.

In the embodiment, the motor base 10 includes for example but not limited to three connecting elements 13, which are annularly distributed and corresponding to each other or equally spaced apart with each other. The first supporting part 131, the second supporting part 132 and the deformation part 133 of the connecting element 13 are configured to form a U-shaped, W-shaped or V shaped structure having at least one bending bridge disposed between the central portion 11 and the surrounding portion 12, so as to cooperatively form a deformable buffer zone 13a (see FIG. 4). Consequently, a multidimensional deformation space is provided for allowing the deformation part 133 to deform, and the central portion 11 is able to occur certain degree of movement or rotation corresponding to the surrounding portion 12. In the embodiment, the first supporting part 131, the second supporting part 132 and the deformation part 133 of the connecting element 13 are made of the same material, for example plastic, but not limited thereto. The first supporting part 131, the second supporting part 132 and the deformation part 133 of the connecting element 13 could be made of different materials. Certainly, the size, the shape, the number, the position and the interval of the connecting elements 13 formed by the first supporting part 131, the second supporting part 132 and the deformation part 133 are adjustable according to the practical requirements, and the present disclosure is not limited thereto. It should be emphasized that the main components of the motor structure 1, such as the winding set 40, are disposed on the central portion 11 of the motor base 10, and the central portion 11 is connected to the surrounding portion 12 through the connecting elements 13. With the deformation of the connecting elements 13 disposed between the central portion 11 and the surrounding portion 12, a multidimensional buffer function is provided to avoid the vibration generated during the operation of the main components of the motor structure 1 being transported to the surrounding portion 12, and improve the supporting strength of the motor base 10 and the effects of eliminating the vibration and the noise.

Moreover, in the embodiment, the motor base 10 further includes a buffer component 14. The buffer component 14 is for example made of rubber, silicon or foaming material, and is disposed between the central portion 11 and the surrounding portion 12. Preferably but not exclusively, the buffer component 14 is filled within the buffer zone 13a cooperatively formed by the first supporting part 131, the second supporting part 132 and the deformation part 133. In some embodiments, the buffer component 14 is merely disposed between the central portion 11 and the surrounding portion 12, which means the buffer component 14 isn't filled within the buffer zone 13a. In the embodiment, the central portion 11, the surrounding portion 12 and the at least one connecting element 13 of the motor base 10 and the buffer component 14 are integrally formed into one piece by over molding or insert molding. The central portion 11, the surrounding portion 12 and the at least one connecting element 13 are made of the same material, for example but not limited to be made of plastic, and the buffer component 14 is made of rubber, but the present disclosure is not limited thereto. In some embodiments, the buffer component 14 is filled or removed from a second surface 102 of the motor base 10 so as to be replaced as the elastic property thereof is weaken. By the buffer component 14, the effects of eliminating the vibration and the noise and the effect of waterproofing of the motor base 10 are further improved.

In the embodiment, the motor structure 1 further includes at least one conductive element 22 and at least one gasket element 23. The conductive element 22 runs through the first side 201 and the second side 202 of the heat dissipation module 20 located on the central portion 11, so as to connect to the circuit board 30 disposed on the first side 201 of the heat dissipation module 20 and the winding set 40 disposed on the second side 202 of the heat dissipation module 20. Certainly, the electrical connection between the circuit board 30 and the winding set 40 is not limited thereto. In addition, the gasket element 23 for example runs through the first side 201 and the second side 202 of the heat dissipation module 20 located on the central portion 11, is disposed between the heat dissipation module 20 and the conductive element 22, so that the conductive element 22 is fixed on the heat dissipation module 20 through the gasket element 23. In the embodiment, the motor base 10, the heat dissipation module 20, the conductive element 22 and the gasket element 23 are integrally formed into one piece for example by over molding or insert molding, so as to simplify the assembly process and eliminate the use of redundant components at the same time. It also benefits to achieve the effects of waterproofing, dustproof and protection. In the embodiment, the conductive element 22 includes a first end portion 221 and a second end portion 222. The first end portion 221 is exposed from the first side 201 and electrically connected to the circuit board 30. The second end portion 222 is exposed from the second side 202 and electrically connected to the winding set 40. In the embodiment, the second end portion 222 further includes a fastening element 223, for example having two arms opposite to each other. The two arms are configured to form two jagged blades in staggered arrangement. The winding set 40 includes at least one conductive terminal 41 and an engagement component 42. The engagement component 42 is configured to engage with the at least one conductive element 22. Preferably but not exclusively, the conductive terminal 41 of the winding set 40 is an end of wire clamped between the two arms of the fastening element 223, so that the conductive terminal 41 is electrically connected with the conductive element 22. Preferably but not exclusively, the engagement component 42 is an engagement slot spatiality corresponding to the two arms of the fastening element 223 and configured to engage with the two arms of the fastening element 223, so that the conductive terminal 41 of the winding set 40 is clamped and fixed between the two arms of the fastening element 223. It should be emphasized that since the two arms of the fastening element 223 are configured to form two jagged blades in staggered arrangement, when the winding set 40 is fixed on the second side 202 of the heat dissipation module 20 and the conductive terminal 41 is assembled on the fastening element 223, the conductive terminal 41 is clamped and the outer insulation layer of copper wire coating over the conductive terminal 41 is scratched to remove, thereby simplifying the assembly process into a single step. Namely, the conductive terminal 41 of the winding set 40 can be assembled and electrically connected to the conductive element 22 without the process of soldering or scratching the copper wire to remove the insulation layer in advance. Certainly, the present disclosure is not limited thereto and not redundantly describe herein.

Moreover, preferably but not exclusively, in the embodiment, the motor structure 1 includes a first cover 50 and a second cover 60 connected to the motor base 10. The first cover 50 is connected to a first surface 101 of the motor base 10 and covers the circuit board 30 disposed on heat dissipation module 20 located on the central portion 11, so as to protect the electronic components disposed on the circuit board 30 and improve the effects of waterproofing and dustproof. Moreover, in order to improve the effect of heat dissipation, the circuit board 30 is attached to the first side 201 of the heat dissipation module 20 through at least one thermal conductive element 31, for example a thermal adhesive, a thermal pad or a thermal paste. The first cover 50 is fixed on the motor base 10 through for example a screw, but the present disclosure is not limited thereto. In addition, the second cover 60 is connected to the second surface 102 of the motor base 10. The second cover 60 has an opening 61. In the embodiment, an accommodation space 15 is defined among the second surface 102 of the motor base 10 and the second cover 60, and the winding set 40 is at least partially received within the accommodation space 15 and located through the opening 61. The winding set 40 is further combined with a bearing 47 to form a stator 43. In the embodiment, the motor structure 1 is exemplified by an outer rotor 71 and an inner stator 43, but the present disclosure is not limited thereto. Preferably but not exclusively, the motor structure 1 includes a fan blade assembly 80. The fan blade assembly 80 is connected to the rotor 71. The rotating shaft 70 of the rotor 71 is connected to the winding set 40 through the bearing 47, so that the winding set 40 can drive the rotor 71 to rotate. Preferably but not exclusively, in the embodiment, the rotating shaft 70 runs through the central opening 24 disposed on the heat dissipation module 20. In addition, the stator 43 formed by the winding set 40 and the bearing 47 is fixed on the central portion 11 of the motor base 10, and the rotor 71 covers the stator 43, so that the motor structure 1 is configured to form a fan motor, but the present disclosure is not limited thereto. Moreover, preferably but not exclusively, the surrounding portion 12 of the motor base 10 includes a first fastening element 17 and the second cover 60 includes a second fastening element 62. The first fastening element 17 and the second fastening element 62 are matched and engaged with each other, so as to fix the second cover 60 on the surrounding portion 12 of the motor base 10. It should be noted that the fastening method of the second cover 60 and the surrounding portion 12 of the motor base 10 is not an essential feature and the present disclosure is not limited thereto. Since the second cover 60 is fixed on the surrounding portion 12 of the motor base 10 and the winding set 40 at least partially received within the accommodation space 15 is fixed on the central portion 11 of the motor base 10, the winding set 40 runs through the opening 61 instead of contacting with the second cover 60. The vibration generated for example by the rotation of the fan blade assembly 80, the rotor 71 and the rotating shaft 70 passing through the bearing 47 relative to the winding set 40 of the stator 43 can be eliminated due to the deformation of the at least one connecting element 13, so that the surrounding portion 12 of the motor base 10 and the second cover 60 are not influenced thereby. On the other hand, the at least heat dissipation element 21 of the heat dissipation module 20 is convexly disposed on the second side 202. After the second cover 60 is assembled with the surrounding portion 12 of the motor base 10, the heat dissipation element 21 of the heat dissipation module 20 is located within the accommodation space 15. In the embodiment, the motor base 10 further includes an airflow channel 16 disposed on the surrounding portion 12 and in fluid communication between the exterior of the motor base 10 and the accommodation space 15. Thus, the convection of air flowing between the exterior of the motor base 10 and the accommodation space 15 is enhanced, and the heat dissipation effect of the heat dissipation module 20 is enhanced. Certainly, the present disclosure is not limited thereto.

From the above descriptions, the present disclosure provides a motor base and a motor structure having an integrally formed motor base.

Owing to the deformable connecting element, the surrounding portion surrounds the central portion through. By utilizing the deformable connecting element connected between the central portion and the surrounding portion to provide buffer function, the strength of the motor base is improved to carry the components such as winding set, and the vibration and the noise of the motor base and motor structure are eliminated. In addition, by utilizing the technique such as over molding or insert molding, the motor base and the buffer component are integrally formed into one piece, so as to simplify the assembly process and eliminate the use of redundant components at the same time. It also achieves the effects of waterproofing, dustproof and protection. Moreover, by combining the motor base and the heat dissipation module, the motor structure having the integrally formed motor base can effectively dissipate the heat for example generated from the heat-generating components on the circuit board, the strength of the motor base is further improved, and the motor structure can achieve high-density construction.

While the disclosure has been described in terms of what is presently considered to be the most practical and preferred embodiments, it is to be understood that the disclosure needs not be limited to the disclosed embodiment.

What is claimed is:

1. A motor structure, comprising:
    a winding set;
    a rotor corresponding to and driven by the winding set; and
    a motor base comprising:
        a central portion configured to dispose the winding set thereon;
        a surrounding portion disposed around the central portion; and
        a plurality of connecting elements deformable and connected between the central portion and the surrounding portion, wherein the plurality of connecting elements are annularly distributed and corresponding to each other or equally spaced apart with each other, and comprises:
            a first supporting part connected with the central portion, wherein the hardness of the first supporting part is greater than or equal to that of the central portion;
            a second supporting part connected with the surrounding portion, wherein the hardness of the second supporting part is greater than or equal to that of the surrounding portion; and
            a deformation part connected between the first supporting part and the second supporting part.

2. The motor structure according to claim 1, wherein the first supporting part, the second supporting part and the deformation part cooperatively form a buffer zone.

3. The motor structure according to claim 2, further comprising a buffer component, wherein the buffer component is disposed between the central portion and the surrounding portion, and is filled within the buffer zone.

4. The motor structure according to claim 3, wherein the central portion, the surrounding portion, the at least one connecting element and the buffer component are integrally formed into one piece by over molding or insert molding.

5. The motor structure according to claim 3, wherein the central portion, the surrounding portion and the at least one connecting element are made of plastic, and the buffer component is made of rubber.

6. The motor structure according to claim 1, further comprising a heat dissipation module disposed on the motor base and comprising a first side and a second side opposite to the first side, wherein the winding set is disposed on the second side of the heat dissipation module.

7. The motor structure according to claim 6, wherein the motor base and the heat dissipation module are combined with each other by over molding or insert molding.

8. The motor structure according to claim 6, wherein the heat dissipation module comprises at least one heat dissipation element convexly disposed on the second side.

9. The motor structure according to claim 6, further comprising a circuit board disposed on the first side of the heat dissipation module and electrically connected to the winding set.

10. The motor structure according to claim 9, further comprising a thermal conductive element disposed between the heat dissipation module and the circuit board, wherein the thermal conductive element is at least one selected from the group consisting of a thermal adhesive, a thermal pad and a thermal paste.

11. The motor structure according to claim 1, further comprising a circuit board disposed on the central portion of the motor base and electrically connected to the winding set.

12. The motor structure according to claim 11, further comprising at least one conductive element running through the central portion and electrically connected between the circuit board and the winding set.

13. The motor structure according to claim 11, further comprising a first cover connected to the motor base and covering the circuit board.

14. The motor structure according to claim 1, further comprising a second cover connected to the surrounding portion of the motor base, wherein an accommodation space is defined by the second cover and the motor base, and the winding set is at least partially received within the accommodation space.

15. The motor structure according to claim 14, further comprising an airflow channel in fluid communication with the accommodation space.

16. A motor base disposed in a motor structure comprising a winding set, the motor base comprising:
    a central portion configured to dispose the winding set thereon;
    a surrounding portion disposed around the central portion; and
    a plurality of connecting elements deformable and connected between the central portion and the surrounding portion, wherein the plurality of connecting elements are annularly distributed and corresponding to each other or equally spaced apart with each other, and comprises:

a first supporting part connected with the central portion, wherein the hardness of the first supporting part is greater than or equal to that of the central portion;

a second supporting part connected with the surrounding portion, wherein the hardness of the second supporting part is greater than or equal to that of the surrounding portion; and a deformation part connected between the first supporting part and the second supporting part.

17. The motor base according to claim 16, wherein the first supporting part, the second supporting part and the deformation part cooperatively form a buffer zone.

18. The motor base according to claim 17, further comprising a buffer component, wherein the buffer component is disposed between the central portion and the surrounding portion, and is filled within the buffer zone.

19. The motor base according to claim 18, wherein the central portion, the surrounding portion, the at least one connecting element and the buffer component are integrally formed into one piece by over molding or insert molding.

20. The motor base according to claim 18, wherein the central portion, the surrounding portion and the at least one connecting element are made of plastic, and the buffer component is made of rubber.

* * * * *